R. Marcher,
Enameling Machine,
No. 940. Reissued Apr. 3, 1860.
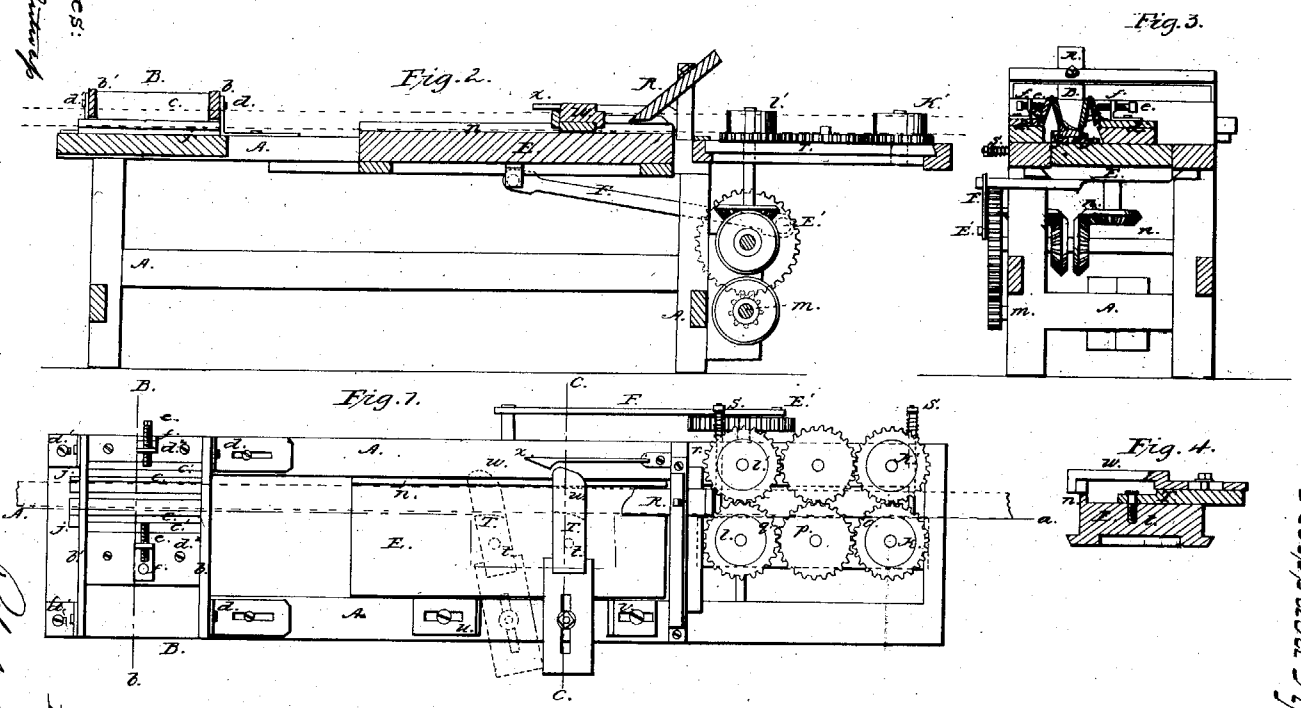
Witnesses:
Peter Van Antwerp
George Beck.
Inventor:
Robert Marcher.

UNITED STATES PATENT OFFICE.

ROBERT MARCHER, OF NEW YORK, N. Y.

IMPROVEMENT IN MACHINES FOR ENAMELING MOLDINGS.

Specification forming part of Letters Patent, No. 24,879, dated July 26, 1859; Reissue No 940, dated April 3, 1860.

*To all whom it may concern:*

Be it known that I, ROBERT MARCHER, of the city, county, and State of New York, have invented certain new and useful Improvements in Machinery for Enameling Moldings; and I do hereby declare that the following is a full, clear, and exact description thereof, reference being had to the accompanying drawings, making part of this specification, in which—

Figure 1 is a plan of the machine; Fig. 2, a longitudinal vertical section taken at the line A *a* of Fig. 1; Fig. 3, a cross vertical section taken at the line B *b* of Fig. 1, and Fig. 4 a cross-section taken at the line C *c* of Fig. 1.

The same letters indicate like parts in all the figures.

The mode of enameling moldings formerly practiced was by laying the composition on the surface of the wooden molding with a brush, and then rubbing it down with pumice-stone, and on the 21st day of October, 1851, Letters Patent were granted to me for an improved method, which has since been extensively used.

This improved method so patented by me consists of a hopper to contain the composition for enameling. The end pieces of the said hopper have their lower edges shaped to correspond with the transverse form of the molding, which said molding during the operation constitutes the bottom of the hopper, the sides of the said hopper being made to fit sufficiently close to the sides of the molding to prevent the free escape of the composition. This machine, or rather this tool, with the composition in it, is moved by hand back and forth over the surface of the molding, and as the the mass of composition in the hopper rests on the molding each operation lays on a given thickness, the surplus being removed by one of the end pieces, which also rubs down the coating to give the required form, and finally the finish or required smoothness is given by either one or both of the said end pieces; and although this in practice has been found to be a valuable improvement in the art of enameling moldings, nevertheless, like all tools, the working of it requires skill and labor.

The object of my present invention is to substitute an organized mechanism for the skill and labor of a workman.

In view of the objects to be obtained, my said invention consists in combining with a plate one edge of which is formed to fit the surface of the molding to be enameled, and with a bed or gage or its equivalent to sustain the molding during its movements in its proper relation to such plate, a feeding mechanism to move the molding and cause it to pass under the edge of the said plate to strike off the surplus composition, and to smooth down the surface of the enamel which remains on.

My said invention also consists in combining with the plate the lower edge of which is fitted to the transverse form of the molding under the combination first named the employment of side plate, the edges of which bear against the molding to prevent the escape of the composition laterally.

My said invention also consists in combining with the elements above enumerated—that is to say, with the mechanism by which the molding is propelled, the plate the lower edge of which is formed the reverse of the molding, the gage which maintains the molding in its proper relations, and with the side plates each side of the molding—or with the equivalents of them, the employment of a second plate having its lower edge formed the reverse in form of the molding, and placed at the opposite end of the side plates, that the two said end plates and the side plates may constitute a hopper to contain the semi-fluid composition, that it may rest on the molding, which, during the operation, constitutes the bottom of the said hopper.

My said invention also consists in making each of the said end plates and each of the said side plates self-adapting to inequalities when combined with the gage and with the mechanism for propelling the molding, or the equivalents of them.

In the accompanying drawings, A represents a suitable frame, and B a hopper composed of four parts—viz., two end plates, *b b'*, and two side plates, *c c*. The end plates, *b b'*, are either secured by screws or other equivalent means to standards *d d'* or adapted to slide on such standards, and held down by their weight, springs, or equivalents therefor. Their lower edges are to be of a form the reverse of the transverse form of the molding to be enameled. The sides of the hopper are formed each of two plates, *c c*, placed at right angles to the end plates, $b$ $b'$, and equal in length to the space between them, so as to work accurately but freely between the said end plates. I prefer to make the sides of the hopper each of two plates, $c$ $c'$, hinged together at their upper edges; and the lower edge of the outer plate, $c'$, is hinged to a plate, $d^2$, secured to the bed-plate or bench of the machine by screws or other equivalent means which will admit of adjustment for moldings of different widths, unless the machine is made to enamel moldings of only one width. The lower edge of the inner plates, $c$ $c$, which form the sides of the hopper, I prefer to rabbet slightly to straddle or ride on the edges of the moldings, to which they are held by a yielding pressure, that they may be self-adapting to any slight variation in the thickness or width of the molding. The yielding pressure is applied by screws $e$ $e$, which bear against the outer plates, $c'$ $c'$, and which are tapped into spring-standards $f$ $f$, attached to the plates $d^2$ $d^2$, secured to the bed or frame. Below the hopper thus formed there is a gage-plate or rest, which I prefer to make in two parts, $j$ $j$, each with a ledge or flange to embrace the sides of the molding. These two parts are secured to the bed or bench of the machine by screws or other equivalent means to admit of setting them nearer to or farther from each other, that a molding of the required width may pass between the ledges or flanges, which act as lateral guides. The upper surface of the molding in passing under the hopper B and resting on the gage below forms the bottom of the hopper, and hence for adjustment to moldings of different thicknesses, either the hopper must be adjustable relatively to the gage $j$ $j$, or vice versa.

The moldings to be enameled are in succession placed on the bench of the machine and presented to and moved forward by two pairs of vertical feed-rollers, $k$ $k'$, $l$ $l'$, which grip the edges thereof. The shafts of the two rollers $k'$ and $l'$ turn in fixed bearings, and the one, $l'$, receives motion from the main shaft $m$ by bevel-wheels $n$ $n$, or other suitable gearing, and imparts a corresponding motion to the other roller, $k'$, by a cog-wheel, $q'$, on its shaft, which engages an intermediate wheel, $p'$, which in turn engages another wheel, $o'$, on the shaft of the roller $k'$; but other suitable gearing may be substituted. The other two rollers, $k$ and $l$, are geared in like manner, and the one, $l$, in like manner receives motion from the main shaft; but these two rollers $k$ $l$ are mounted in a frame or carriage, $r$, adapted to slide in the frame at right angles to the line of motion of the molding, and by means of springs $s$, or other equivalent means, are forced toward the rollers $k'$ and $l'$ that the two pairs of rollers may grip the moldings with sufficient force to give the required feeding motion.

If the machine be intended for operating on moldings which vary materially in width, the shaft of the roller $l$ may be provided with a universal joint, or other equivalent means, to admit of the required play, so that the carriage $r$, with the rollers $k$ $l$, can move toward or from the rollers $k'$ $l'$. The strips of moldings are to be placed, one by one and in succession, on the bench, and introduced between the feed-rollers $k$ $k'$ $l$ $l'$, by which they are gripped and propelled by a regular motion toward the hopper, and before the rear end of one strip leaves the bite of the first pair of rollers the next strip should be introduced, that the ends of the two may be in contact in passing under the hopper. Beyond the feed-rollers there is an adjustable block, R, to hold down the molding as it is moved forward by the rollers or equivalent feed-motion. As the molding is moved along toward the hopper, it is guided by a fence, $n$, which is simply a straight-edge secured to the frame, and, if desired, a like straight-edge may be used on the other side, and which may be either fixed or movable, and forced against the edge of the moldings by springs or weights, as in machines for planing. As the molding progresses, it passes under the hopper, and during the operation becomes the bottom thereof, and for this reason the enameling composition should not be applied until a molding has been introduced to form the bottom of the hopper, so that such composition shall rest on and apply itself to the surface to be enameled, the surplus being struck off to a determined gage by the lower edge of the end plate $b'$, which also performs the office of rubbing down the enamel as the molding moves under it. The sides of the hopper not only hold the enamling composition on the molding in sufficient quantities to insure good work, but at the same time, if desired, may give a proper finish to the edges of the molding.

The sole purpose of the end plate $b$ is to prevent the enameling composition from running out when the molding is at rest, or when a large quantity is put in the hopper at once; but if the molding be moved at a good velocity, and the quantity of composition is not too large, the end plate $b$ may be dispensed with, as the motion of the molding will carry the composition toward and cause it to pile up, as it were, against the other end plate, $b'$; and even the side plates may be dispensed with if the composition be applied in very moderate quantities; but the best results will be obtained if the entire hopper be used.

A portion of the inner part of the side plates, $c$ $c$, of the hopper, near to the end plate $b'$, may be cut away, if desired, to allow the enameling to coat the edges of the molding.

It will be obvious that if the machine be made to enamel moldings which are accurately planed of uniform thickness and width the side pieces of the hopper may be fixed, and that the end pieces of the said hopper may be set and fixed for each successive operation, care being taken to readjust the parts for each successive coat; but I prefer to make these parts self-adapting.

Other and equivalent modes of moving the moldings may be substituted, and one of the modes which I have contemplated is by a longitudinal reciprocating carriage, E, receiving motion by a crank, E′, and connecting-rod F, This carriage is adapted to slide in suitable ways in the main frame. One side of this carriage has a flange or ledge, *n*, against which one edge of the molding is gripped by a cam-like lever, T, which vibrates on a fulcrum-pin, *t*, on the carriage. The inner end of this gripping-lever is curved or cam-like, so that when it is placed in the diagonal position represented by dotted lines the molding will not be gripped, and hence the carriage can move back without carrying back the molding; and this gripping-lever is thrown into this position toward the end of the forward motion of the carriage by striking against a stop, *u*, on the frame. On the return motion of the carriage this gripping-lever strikes another stop, (*v*, at the other end, which throws it nearly into the position represented by full lines; but as the operation of the grip-lever to grip the molding would of necessity cause the molding to be gripped a little before the completing of the back motion of the carriage, which would result in giving a slight back movement to the molding, which is to be avoided, I employ this simply to get the gripping-lever in a position to be operated to complete the grip by the beginning of the forward motion. This is effected by an arm, *w*, attached to and projecting beyond the end of the griping-lever. As the gripping-lever strikes the stop (*v* toward the end of the back motion of the carriage, the arm *w* is forced by the bevel end of a spring-dog, *x*, and so soon as the carriage begins to move forward the arm *w* strikes the lip of the spring-dog, which turns the gripping-lever into the position represented by full lines, thereby causing it to grip the molding against the flange or ledge *n* of the carriage with such force as to feed it along, and as the arm cannot be vibrated beyond this it forces back the spring dog and escapes from it.

For the convenience of adjusting the arm *w* to the spring-dog, the arm is made with side wings to embrace the sides of the gripping-lever and slide on it, and the bolt by which the two are connected passes through elongated slots, which admit of the required adjustment.

What I claim as my invention, and desire to secure by Letters Patent, is—

1. The combination of the mechanism, or the equivalent thereof, for propelling the molding with the plate the lower edge of which is formed the reverse of the molding to strike off the surplus enameling, and to rub it down, and with the bed or gage, which sustains the molding in its proper relations to the said plate, substantially as and for the purpose specified.

2. In combination with the combination above claimed, the employment of the side plates at the sides of the molding, substantially as and for the purpose specified.

3. In combination with the parts enumerated as claimed in combination in the second of the above claims, the employment of the other of the plates specified as having its lower edge of the reverse form of the molding, substantially as and for the purpose specified.

4. Making each of the said end plates and each of the said side plates, or all of them, self-adapting by yielding pressure, substantially as described, when combined with the mechanism, or its equivalent, for feeding the molding, and with the bed or gage, substantially as and for the purpose specified.

ROBERT MARCHER.

Witnesses:

PETER VAN ANTWERP,
GEORGE BEST.